US008502701B2

(12) United States Patent
Goh et al.

(10) Patent No.: US 8,502,701 B2
(45) Date of Patent: Aug. 6, 2013

(54) RUNWAY STATUS INDICATOR

(75) Inventors: Juliana Joo-Hong Goh, Kirkland, WA (US); Samuel T. Clark, Federal Way, WA (US); Jill M. Martins, Lynnwood, WA (US); Roglenda R. Bowe, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 750 days.

(21) Appl. No.: 12/580,733

(22) Filed: Oct. 16, 2009

(65) Prior Publication Data

US 2011/0090096 A1 Apr. 21, 2011

(51) Int. Cl.
*G01C 21/00* (2006.01)

(52) U.S. Cl.
USPC ............................ 340/972; 340/971; 340/973

(58) Field of Classification Search
USPC .................... 340/972, 973, 971; 701/10, 212, 701/120, 122; 345/7
See application file for complete search history.

(56) References Cited

U.S. PATENT DOCUMENTS 5,629,691 A * 5/1997 Jain ............................... 340/961
6,694,249 B1 * 2/2004 Anderson et al. ............. 701/120
6,957,130 B1 10/2005 Horvath et al.
7,222,017 B2 * 5/2007 Clark et al. ................... 701/120
7,230,632 B2 * 6/2007 Coldefy et al. ............... 345/619
7,308,343 B1 * 12/2007 Horvath et al. .................... 701/3
7,345,693 B2 * 3/2008 Coldefy et al. ............... 345/660
7,755,516 B2 * 7/2010 Clark et al. ................... 340/961
7,796,055 B2 * 9/2010 Clark et al. ................... 340/972
7,813,845 B2 * 10/2010 Doose et al. ..................... 701/16

FOREIGN PATENT DOCUMENTS

EP 1835260 A1 9/2007
EP 1918898 A2 10/2007

OTHER PUBLICATIONS

Combined Search and Examination Report under Sections 17 and 18(3) in Application No. GB1017508.1 dated Mar. 25, 2011.
Geller, Tom "Imaging the World: The State of Online Mapping" Mar./Apr. 2007, IEEE Computer Graphics and Applications.

* cited by examiner

*Primary Examiner* — Toan N Pham
(74) *Attorney, Agent, or Firm* — Hope Baldauff, LLC

(57) ABSTRACT

Technologies are described herein for displaying runway status information to a pilot in an aircraft. In one aspect of the present disclosure, a runway status display module displays a runway status indicator indicating the runway status information at a fixed scale independent of a scale of the map on a map display. In another aspect, the runway status indicator is displayed on a non-map display indicating the runway status of the runway. In another aspect, the runway status indicator is displayed at a position independent from a depiction of the runway on the aircraft display.

20 Claims, 8 Drawing Sheets

RUNWAY STATUS INDICATOR

FIELD OF THE DISCLOSURE

The present disclosure relates generally to avionics and navigation systems, and in particular to processing and displaying runway status information regarding a runway on an aircraft display.

BACKGROUND

Providing a pilot of an aircraft with status information regarding a runway when the aircraft is on, near, or approaching the runway may reduce or prevent runway incursions and accidents. The runway status information may inform the pilot that the runway is either in-use, occupied, available, active, or closed, amongst others. Currently, a pilot may receive runway status information through radio communications, by observing runway activities from the cockpit, or by receiving runway status on an aircraft display of the aircraft.

In existing systems, runway status information may be displayed on a navigation display (ND), electronic flight bag display, or other scalable aircraft display in relation to a depiction of the runway. However, the runway status information may be displayed at a size or at a position that may be unclear to the pilot or not viewable by the pilot depending on the display range. Further, the runway status information may not be available on other displays of the aircraft. Runway status information is useful during the taxi, approach/landing and takeoff phases of flight. During these phases of flight, the pilot's attention is focused mainly on the primary flight display (PFD) or the head-up display (HUD). Therefore, displaying runway status information on the PFD and the HUD helps ensure pilot awareness.

It is with respect to these considerations and others that the disclosure made herein is presented.

SUMMARY

Technologies are described herein for providing runway status information to a pilot of an aircraft. The runway status information may be displayed on a map display, a non-map display, or other aircraft display. In one aspect of the present disclosure, a runway status display module receives runway status information for a relevant runway, and displays a runway status indicator indicating the runway status information at a fixed scale independent of the map display scale. In another aspect, the runway status indicator is displayed on a non-map display indicating the status of the runway. In one embodiment, the runway status indicator is displayed at a position independent from a depiction of the runway on the aircraft display.

It should be appreciated that the above-described subject matter may also be implemented in various other embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
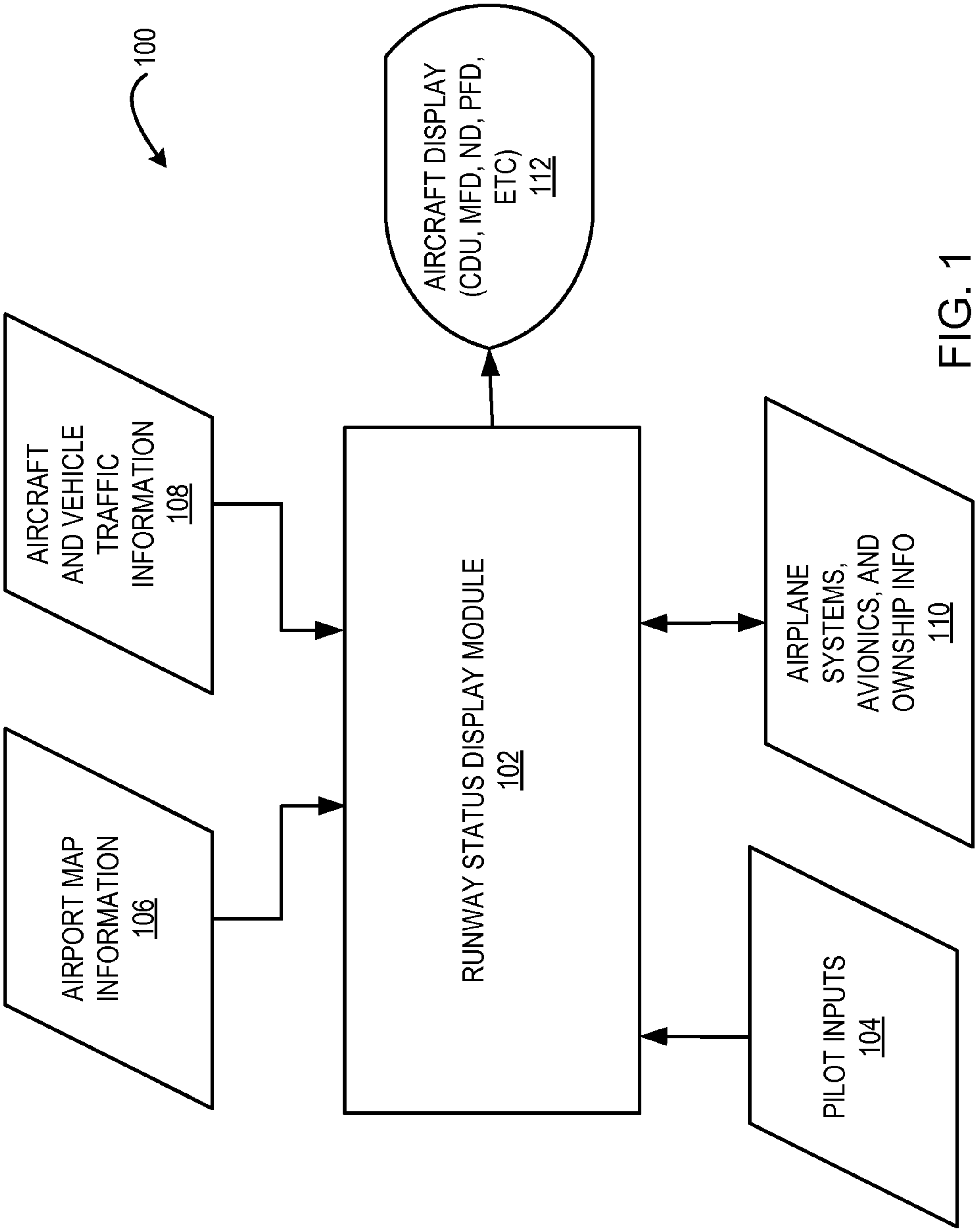
FIG. 1 is a data architecture diagram showing various aspects of an airport runway status display system of an aircraft, according to embodiments presented herein.

The following detailed description is directed to methods, systems and computers for displaying runway status information on an aircraft display. Utilizing the concepts and technologies described herein, aircraft crews are provided with readily available visual access to runway status information while taking off, landing and taxiing the aircraft. The display of runway status information on one or more aircraft displays in the aircraft cockpit in a manner that is clear to the aircraft crew improves crew situational awareness and decreases the potential for runway incursion and traffic collision hazards. These and other advantages and features will become apparent from the description of the various embodiments below.

Throughout this disclosure, embodiments are described with respect to an aircraft and the operation of an aircraft at an airport. An aircraft provides a useful example for embodiments described herein, since it likely represents the majority of vehicles operating on the runways of an airport. However, it should be understood that the concepts presented herein are equally applicable to ground vehicles operating on the taxiways, runways, ramps, and roadways of an airport, including, but not limited to, aircraft tow tractors, emergency response vehicles, aircraft service vehicles, and airport maintenance vehicles.

Further, while portions of this disclosure describe information regarding approaching runways, it will be appreciated by one skilled in the art that the processing and display of runway status information shown in the figures and described herein may be applied to any runway that may occur along the aircraft's path during taxi, takeoff, and landing. These runways may include, but are not limited to, crossing runways, takeoff (departure) and landing (arrival) runways, runway taxi segments, and land and hold short operations ("LAHSO") runway points. In alternative embodiments, status may be displayed for crossing taxiways, taxiway hold points, ramp hold points, and roadway hold points.

In existing systems, runway status information may be displayed on a map display, such as the navigation display (ND). However, the runway status information is displayed on the map display in relation to a depiction of the runway, such as a box, line, or other indicator drawn around, on or along the runway on the map. This means that the runway status information only appears on the map display to the extent that the depiction of the runway appears on the map display. Therefore, in existing systems, the pilot may be unable to view the runway status information when the map display does not display a depiction of the runway. When the aircraft display is set at a relatively low range setting, which is typical during taxi, the runway may be offscale and runway status information may not be displayed. When the aircraft display is set at a relatively high range setting, which is typical during the take-off and approach/landing phases of flight, the runway status information being displayed may be difficult to decipher because the runway status information displayed is too small. Therefore, depending on the range of the map display, the runway status information is either not viewable by the pilot or viewable but unclear to the pilot. Further, in existing systems, the runway status information is only displayed on a map display, such as the ND. However, during landing and take-off, the pilot's attention may be primarily focused on non-map displays, such as the primary flight display (PFD) or the head-up display (HUD), and the pilot may not be informed of a conflicting runway status without viewing the ND.

According to the present disclosure, the pilot is able to view an indication of the status of the runways without the need to be at a range on the map display where the airport map image is viewable. In addition, by providing status information on the PFD and/or the HUD, the pilot is able to receive status information without attending to the ND. By implementing embodiments of the present disclosure, the pilot's natural scan pattern of attending to the PFD and/or the HUD on takeoff and landing may, therefore, be preserved. In the following detailed description, references are made to the accompanying drawings that form a part hereof and that show by way of illustration specific embodiments or examples. In referring to the drawings, like numerals represent like elements throughout the several figures.

FIG. 1 is a data architecture diagram that shows various aspects of an airport runway status display system 100 of an aircraft. The airport runway status display system 100 may include algorithms, application modules and programs for performing the various operations described herein. According to embodiments, the airport runway status display system 100 includes a runway status display module 102. The runway status display module 102 determines and displays the runway status of runways at an airport. As will be described below, the runway status display module 102 may be implemented as software or hardware capable of receiving and interpreting data as described herein for display within an aircraft or other vehicle. Information collected by the runway status display module 102 may include, but is not limited to pilot inputs 104, airport map information 106, aircraft and vehicle traffic information 108, and airplane systems, avionics, and ownship information 110.

The runway status display module 102 may receive pilot inputs 104 for determining the runway for which the runway status is to be displayed, for determining traffic display, and for determining runway status display. The pilot inputs may include selections of runways for landing and takeoff that the pilot has entered into one or more of the systems operating in the aircraft.

The runway status display module 102 may receive airport map information 106 from an airport map data source that contains an electronic database of the airport taxiways and runways. The airport map information 106 may be stored in the database unit of the airport runway status display system 100 or any other system operating within the aircraft, which may further contain map information for a number of airports where the aircraft operates. The runway status display module 102 uses the airport map information 106 to determine the identity, location, and orientation of runways, taxiways, and roadways at an airport.

The runway status display module 102 may also receive aircraft and vehicle traffic information 108 regarding other aircrafts and other ground transportation at the airport, such as type, location and heading of other vehicles. In one embodiment, the aircraft and vehicle traffic information 108 may be received by Automatic Dependence Surveillance-Broadcast (ADS-B). ADS-B allows an aircraft to receive position information of other aircraft operating in proximity to the aircraft.

The runway status display module 102 is configured to utilize the airport map information 106 and the aircraft and vehicle traffic information 108 to determine the status of runways at the airport. According to one embodiment, the runway status display module 102 may use the speed, direction, altitude, and heading of the aircraft and other vehicles operating in proximity to runways to determine the status of each runway, as described in detail in a co-pending U.S. Patent Application Publication No. 2008/0106438 A1, entitled "Runway Status Indication and Traffic Information Display and Filtering," filed on Nov. 2, 2006, which is hereby incorporated herein by reference in its entirety.

The runway status display module 102 may display the runway status information on an aircraft display 112. According to embodiments, the aircraft display 112 may be located in the cockpit of the aircraft and may be an alphanumeric display, such as a control display unit (CDU), or a graphical display, such as an ND, a PFD, a HUD, or a multi-function display (MFD) found in a modern "glass cockpit." Alternatively, the aircraft display 112 may be a laptop computer display, an electronic flight bag display, a handheld display, or other suitable display. In another embodiment, the runway status information may be accompanied by an aural attention-getter, or redundant or complimentary aural information. The runway status display module 102 may provide the accompanying aural information through a speaker also located in the cockpit of the aircraft.

In one embodiment, the runway status display module 102 displays runway status information related to a runway for which the aircraft is currently on approach for landing or on for takeoff. According to other embodiments, the runway status display module 102 may determine and display the status of one or more runways that the aircraft may cross or occupy during the taxi, take-off, and approach/landing phases of flight. In various embodiments, the runway status display module 102 may determine the runway for which the runway status is to be displayed based on pilot inputs 104, the location and heading of the aircraft and the location and orientation of the runway. Using this information, the runway status display module 102 may decipher the runway that the aircraft is approaching a runway for landing, taking off or crossing.

Figure 2:
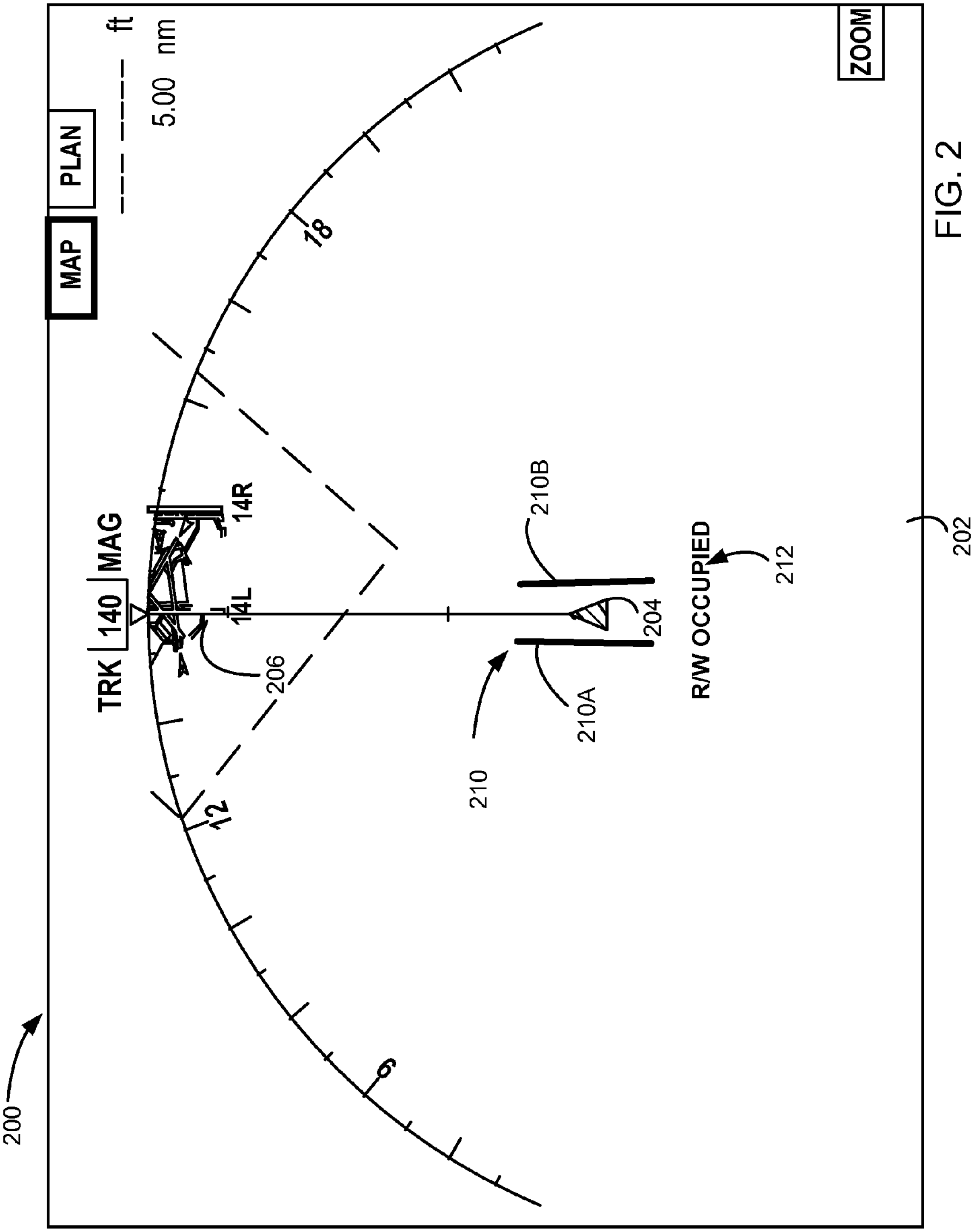
FIG. 2 is a screen image of a navigation display of the aircraft displaying graphical and alphanumeric runway status information independent of a depiction of the runway on the navigation display, according to embodiments presented herein.

FIG. 2 is a screen image 200 of an ND 202 displayed on an aircraft display 112 of the aircraft showing the runway status information regarding a runway. The ND 202 includes an ownship position indicator 204 indicating the current position of the aircraft on the map. The ND 202 also displays the runway 206 and at least one runway status indicator conveying the runway status to the pilot. According to the present embodiment, a symbolic runway status indicator 210 includes a pair of solid bold parallel lines 210A and 210B displayed on the ND 202 at a position independent of the position of the runway 206. For example, the symbolic runway status indicator 210 may be positioned about the ownship position indicator 204, as shown in FIG. 2. As mentioned above, it should be appreciated that the symbolic runway status indicator 210 may be a symbol or graphical representation that may convey a runway status to the pilot. In the present embodiment, a pair of solid bold parallel lines 210A and 210B indicates that the runway is occupied. In addition, the symbolic runway status indicator 210 may be displayed as a pair of flashing lines indicating that the runway is in-use or as dashed lines indicating that the runway is active. Other variations to the symbolic runway status indicator 210 may represent other runway statuses, such as closed, open, and the like. Further, it should be appreciated that the runway status indicator 210 may change when the status of the runway changes. In alternate embodiments, the symbolic runway status indicator 210 may not be a pair of lines 210A and 210B, but may rather be a single line, a circle, a triangle or any other shape or other visual image that may convey a runway status to the pilot.

In another embodiment, the ND 202 further includes an alphanumeric or textual runway status indicator 212 that provides a textual representation of the runway status information for the runway 206. The textual runway status indicator 212 may be displayed anywhere on the aircraft display 112 and may be displayed at a scale independent of the range of the ND 202. In the present embodiment, the textual runway status indicator 212 is displayed below the ownship position indicator 204. In an alternative embodiment, the numeric runway identifier may be included with the text. It should be appreciated that the textual runway status indicator 212 may display the runway status using alphabetical characters, numerical characters, alphanumeric characters, or other textual characters.

Figure 3:
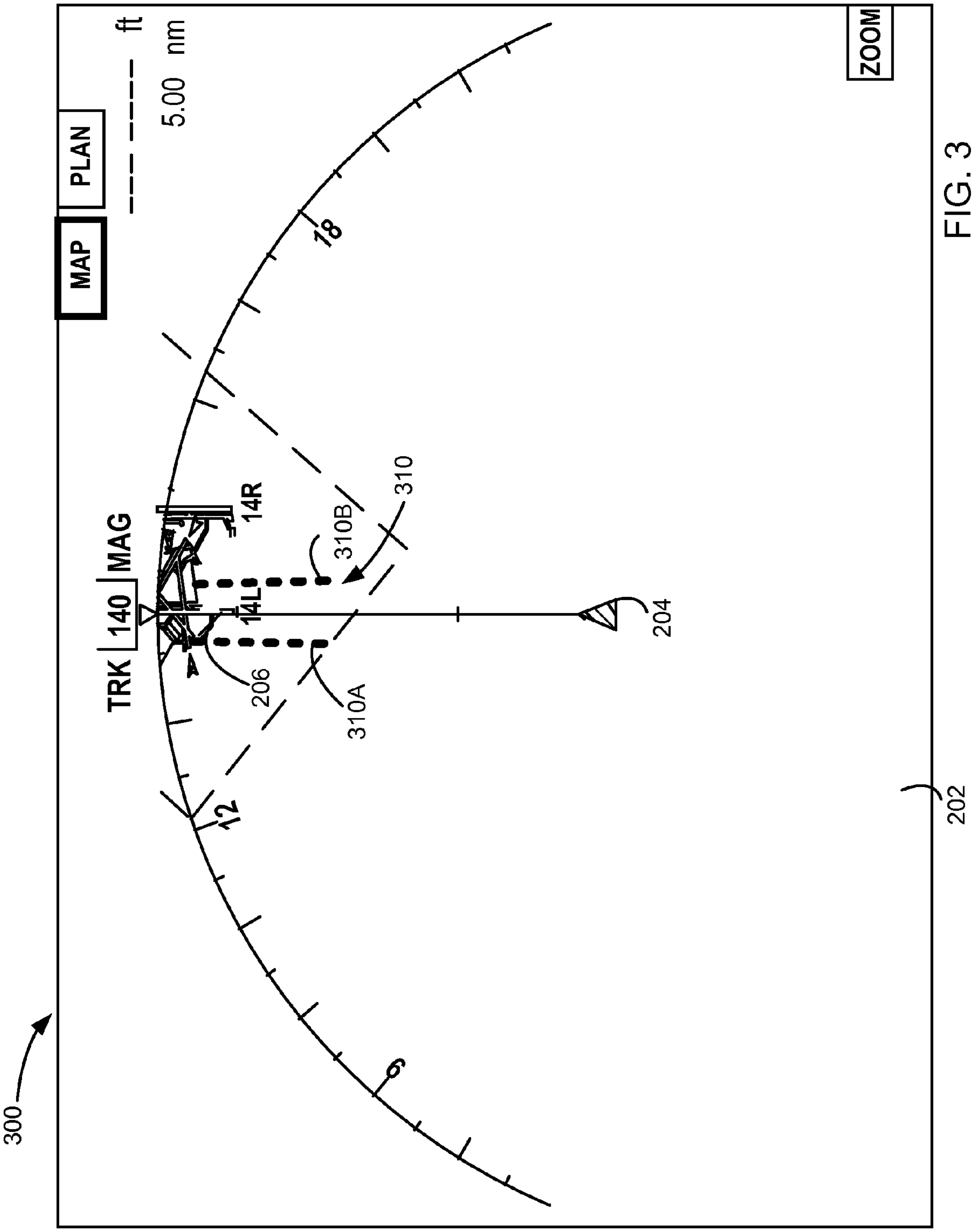
FIG. 3 is a screen image of the navigation display of the aircraft displaying fixed scale graphical runway status information, according to embodiments presented herein.

Referring now to FIG. 3, another screen image 300 of the ND 202 of the aircraft displaying fixed scale runway status information is shown. As shown in the ND 202, an alternate runway status indicator 310 includes a pair of dashed lines 310A and 310B that are positioned close to the runway 206. Although the runway status indicator 310 is positioned close to the depiction of the runway 206, the runway status indicator 310 is displayed at a fixed scale that is independent of the range of the ND 202. Therefore, even if the range of the ND 202 is decreased or increased, the scale of the runway status indicator 310 will not change, allowing a pilot to clearly view the runway status indicator 310 regardless of the range setting of the ND 202. It should be appreciated that the pair of dashed lines 310A and 310B indicate that the runway status is in-use. As described above, when the status of the runway changes, the runway status indicator may change to being solid, flashing, or solid and flashing, depending upon the status of the runway. It should be appreciated that the runway status indicator 310 may further be a single line or any other symbol.

Figure 4:
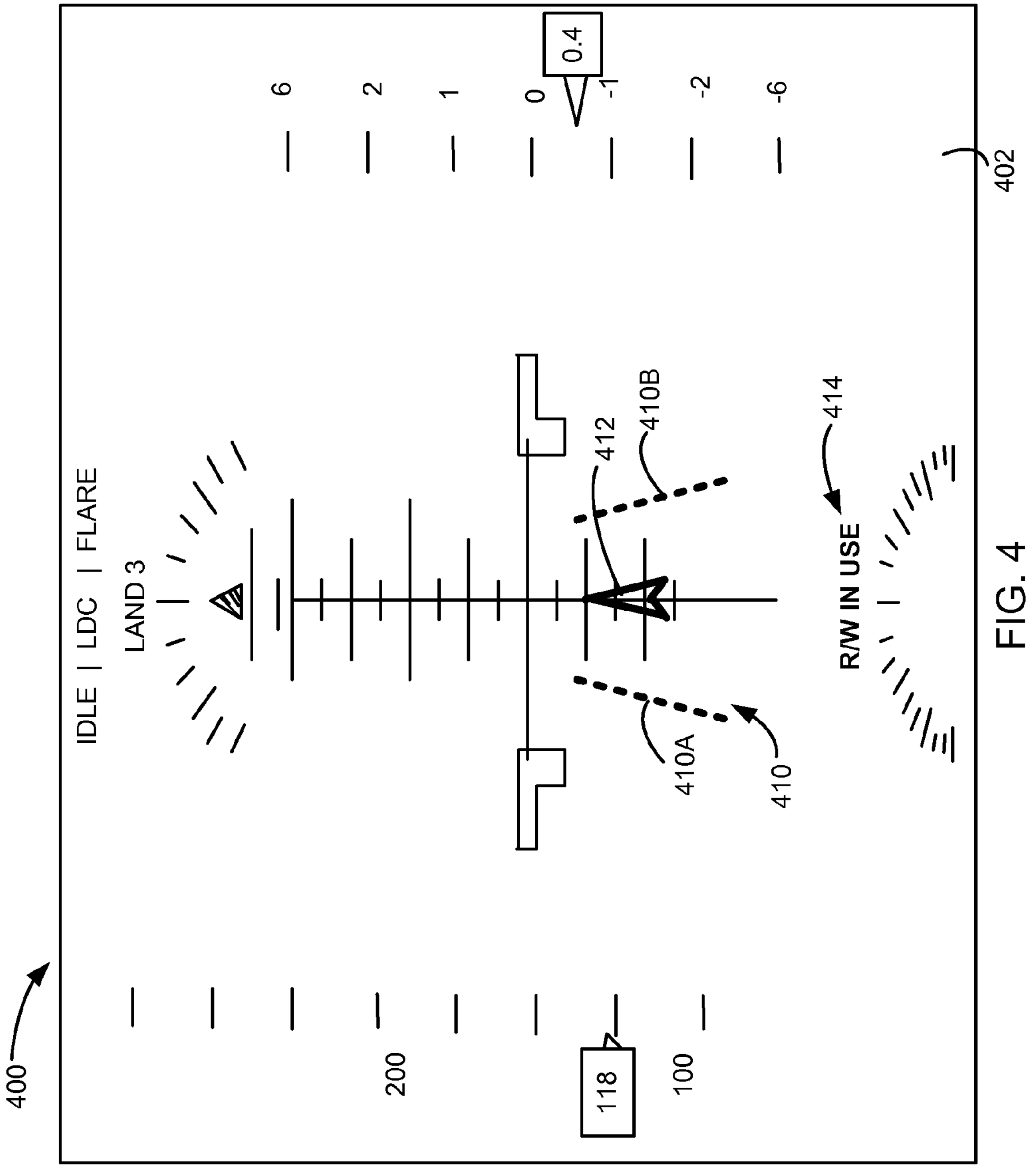
FIG. 4 is a screen image of a primary flight display of the aircraft displaying runway status and traffic information, according to embodiments presented herein.

FIG. 4 is a screen image 400 of a PFD 402 of the aircraft displaying runway status information. The PFD 402 may also be configured to display runway status information for a runway that the aircraft is approaching. The screen image 400 includes at least one runway status indicator that conveys the runway status of the approaching runway to the pilot. For instance, a symbolic runway status indicator 410 may be displayed as a pair of converging or parallel lines 410A and 410B near the center of the screen image 400 on the PFD 402. Additionally, the PFD 402 may include a runway traffic indicator 412 that conveys the heading of a vehicle or vehicles that may be occupying the approaching runway. In one embodiment, the runway traffic indicator 412 may further convey the runway status of the runway to the pilot. In alternative embodiments, the runway traffic indicator may convey traffic speed, acceleration, air/ground state or other information. It should be appreciated that the runway traffic indicator 412 may be a symbol or visual graphic. Further, the PFD 402 may additionally, or alternatively, include a textual runway status indicator 414 that conveys runway status to the pilot. The textual runway status indicator 414 may be positioned anywhere on the PFD 402, independent of the position of the runway graphic, such as towards the bottom of the screen image 400, as shown in FIG. 4. It should be appreciated that the text runway status indicator 414 may display the runway status using alphabetical characters, numerical characters, alphanumeric characters, or other textual characters.

Figure 5:
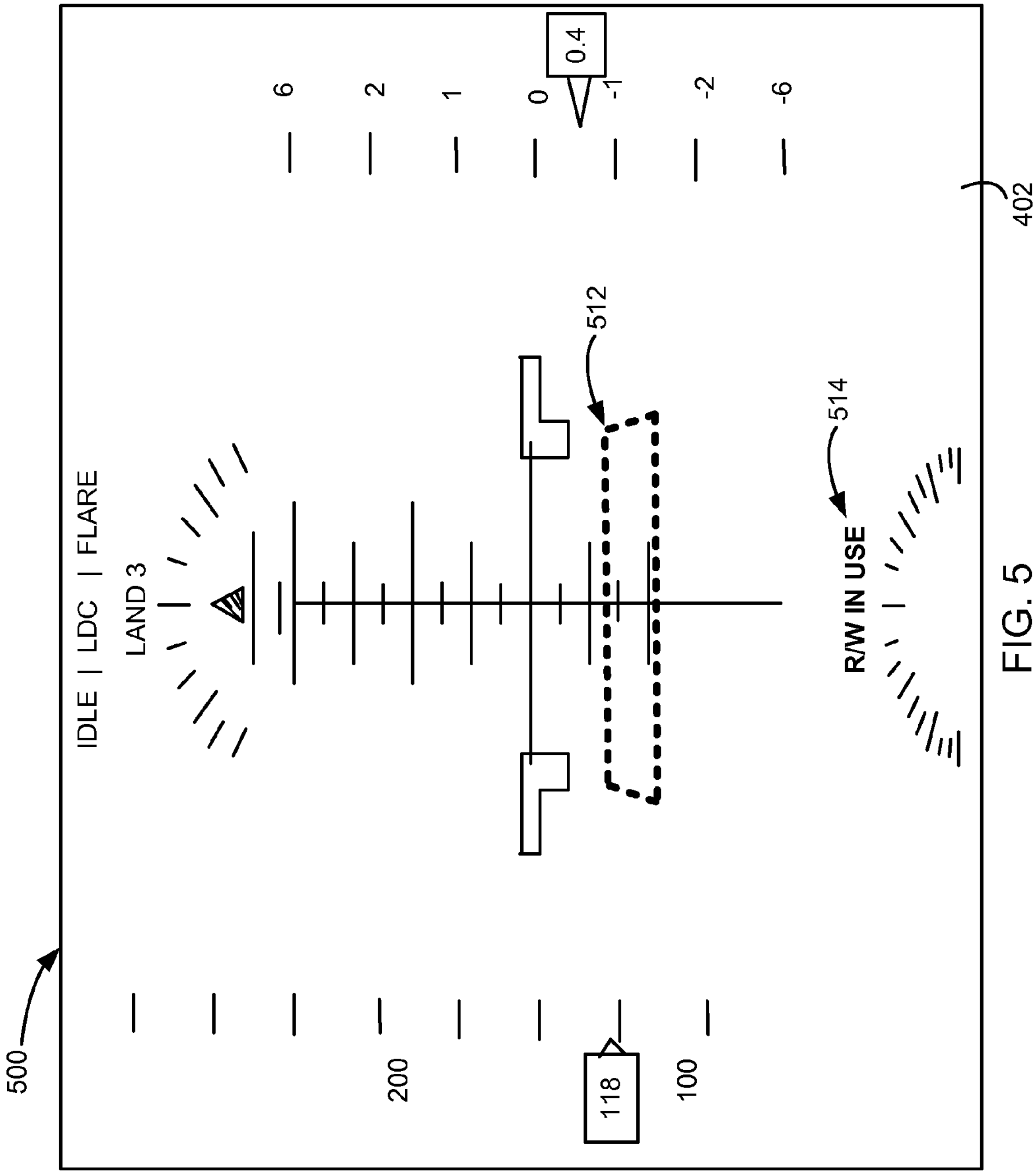
FIG. 5 is a screen image of the primary flight display of the aircraft displaying runway status information, according to embodiments presented herein.

FIG. 5 is a screen image 500 of the PFD 402 of the aircraft displaying runway status information. In this embodiment, the PFD 402 displays a rising runway indicator 512 that also serves as a runway status indicator. The rising runway indicator 512 may be displayed as a trapezoid using lines that change form upon a change in the runway status. The form of the lines may be dashed, solid, flashing, bold, or color coded, amongst others. In the present embodiment, the rising runway indicator 512 is displayed using dashed lines, which indicates that the status of the runway is in-use. In alternative embodiments, the rising runway indicator may be displayed on the PFD 402 as a horizontal, vertical or diagonal line. In addition, a text runway status indicator 514 may be positioned anywhere on the PFD 402 and may be independent of the position of the rising runway indicator 512. Similar to the text runway status indicator 414, it should be appreciated that the text runway status indicator 514 may also display the runway status using alphabetical characters, numerical characters, alphanumeric characters, or other textual characters.

Figure 6:
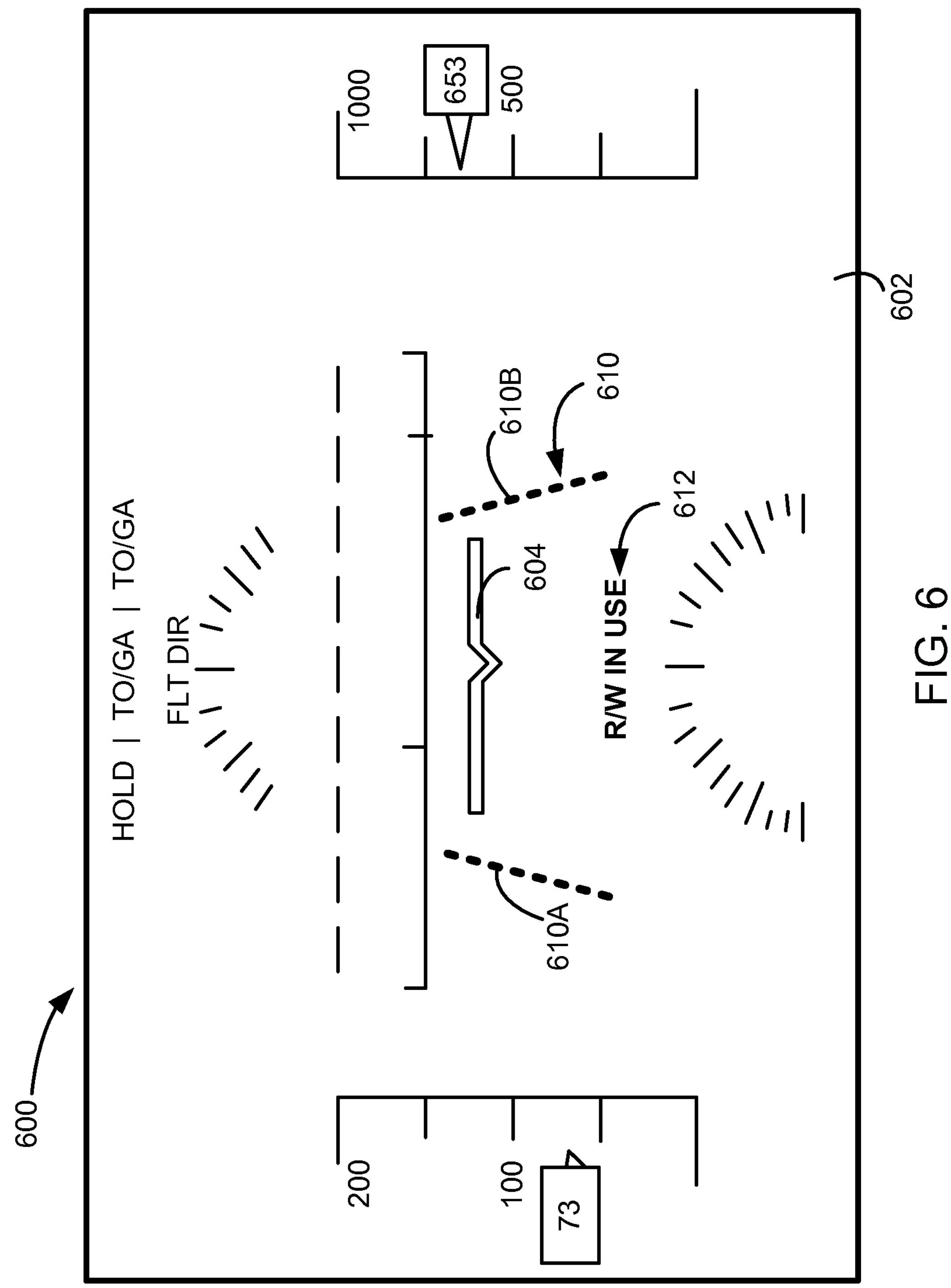
FIG. 6 is a screen image of a head-up display of the aircraft displaying runway status information, according to embodiments presented herein.

FIG. 6 is a screen image 600 of a HUD 602 of the aircraft displaying runway status information. The HUD 602 may also be configured to display runway status information for the runway that the aircraft is approaching. The HUD 602 may include an aircraft indicator 604 indicating the aircraft and at least one runway status indicator that conveys the runway status to the pilot. For instance, the HUD 602 may display a symbolic runway status indicator 610, which includes a pair of dashed lines 610A and 610B indicating that the runway is in use. The symbolic runway status indicator 610 may be displayed anywhere on the HUD 602, including around the aircraft indicator 604. In addition, the HUD 602 may include a textual runway status indicator 612 that conveys the runway status of the runway. The textual runway status indicator 612 may be positioned anywhere on the HUD 602, independent of the position of the aircraft indicator 604, such as towards the bottom of the HUD 602 as shown in FIG. 6. It should be appreciated that the text runway status indicator 612 may display the runway status using alphabetical characters, numerical characters, alphanumeric characters, or other textual characters.

Figure 7:
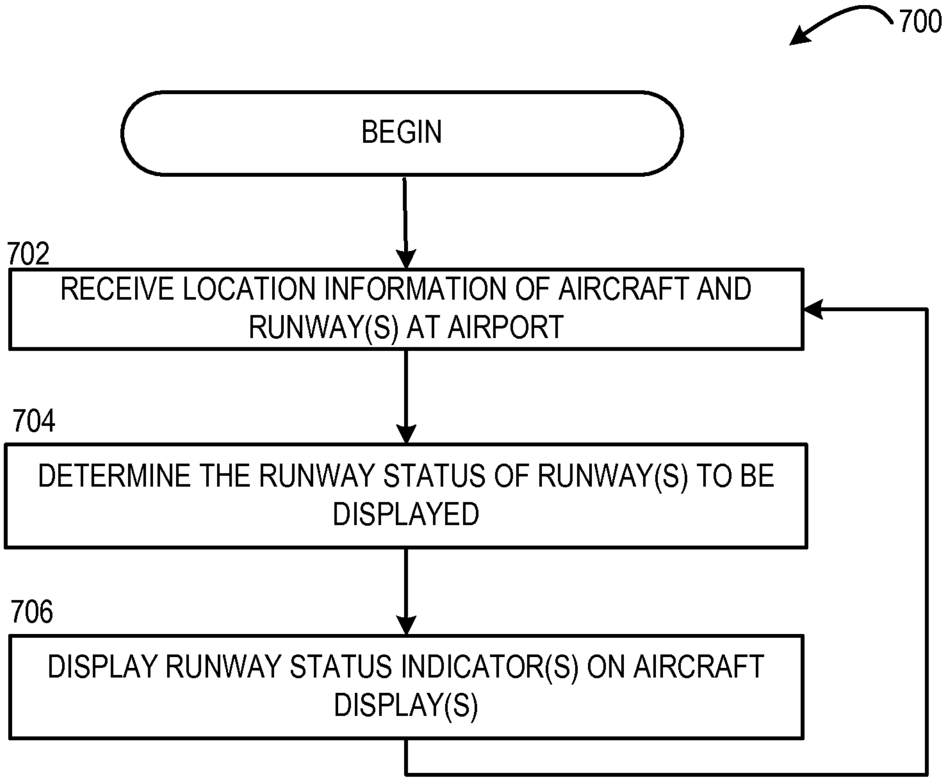
FIG. 7 is a logical flow diagram illustrating a routine for displaying runway status information on an aircraft display, according to embodiments presented herein.

Turning now to FIG. 7, additional details will be provided regarding embodiments presented herein for displaying runway status information on an aircraft display. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 7 shows a routine 700 for displaying runway status information on an aircraft display 112, according to embodiments described herein. The routine 700 begins at operation 702, where the runway status display module 102 receives location information pertaining to runways and other aircraft at the airport. As described above, the runway status display module 102 receives aircraft and vehicle traffic information, such as the location, speed, altitude, and heading of other aircraft. The runway status display module 102 also receives airport map information 106 indicating the position and orientation of runways at an airport. Once the location information is received by the runway status display module 102, the routine 700 proceeds from operation 702 to operation 704, where the runway status display module 102 determines the runway status of one or more runways at the airport. The runway status display module 702 may determine the runway status of a runway by combining the information regarding the current position, heading and speed of the aircraft and other aircraft in reference to the orientation and layout of runways at an airport. In one embodiment, the runway status display module 102 determines the status of the runway the aircraft is approaching for takeoff, landing or crossing.

From operation 704, the routine 700 proceeds to operation 706, where the runway status display module 102 displays the status of the one or more runways at the airport on one or more aircraft displays 112 in a manner described above in regard to FIGS. 2-6. From operation 706, the routine 700 returns to operation 702, where the routine 700 is repeated continuously to display the updated runway status.

Figure 8:
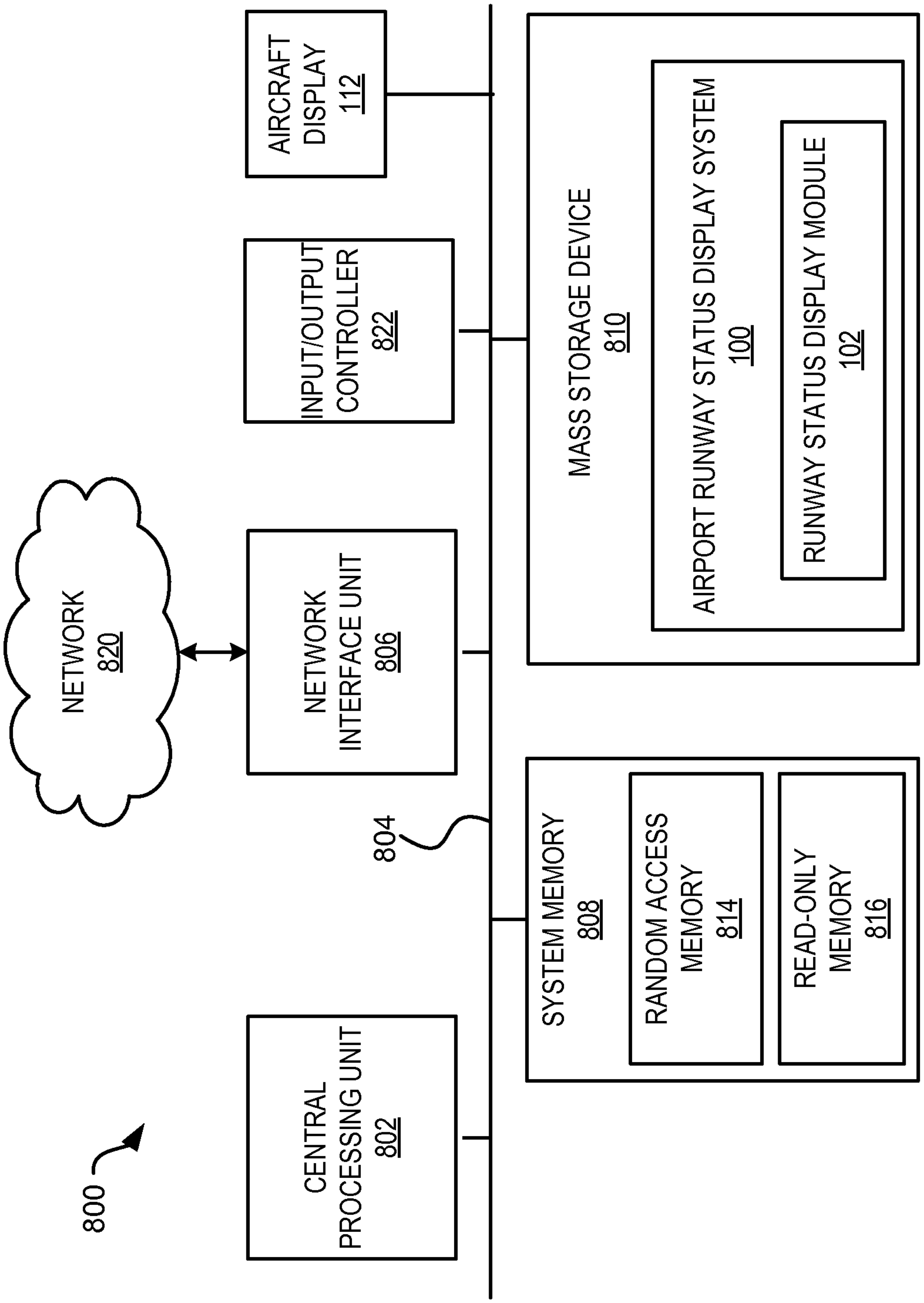
FIG. 8 is a block diagram showing an illustrative computer hardware and software architecture for a computing system capable of implementing aspects of the embodiments presented herein.

FIG. 8 shows an illustrative computer architecture 800 capable of executing the software components described herein for displaying runway status information on an aircraft display 112 in the manner presented above. The computer architecture 800 includes a central processing unit 802 (CPU), a system memory 808, including a random access memory 814 (RAM) and a read-only memory 816 (ROM), and a system bus 804 that couples the memory to the CPU 802.

The CPU 802 is a standard programmable processor that performs arithmetic and logical operations necessary for the operation of the computer architecture 800. The CPU 802 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 800 also includes a mass storage device 810 for storing an operating or control system, as well as specific application modules or other program modules, such as the runway status display module 102 described above in regard to FIG. 1. The mass storage device 810 is connected to the CPU 802 through a mass storage controller (not shown) connected to the bus 804. The mass storage device 810 and its associated computer-readable media provide non-volatile storage for the computer architecture 800.

The computer architecture 800 may store data on the mass storage device 810 by transforming the physical state of the mass storage device to reflect the information being stored. The specific transformation of physical state may depend on various factors, in different implementations of this description. Examples of such factors may include, but are not limited to, the technology used to implement the mass storage device 810, whether the mass storage device is characterized as primary or secondary storage, and the like. For example, the computer architecture 800 may store information to the mass storage device 810 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 800 may further read information from the mass storage device 810 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 800. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 800.

According to various embodiments, the computer architecture 800 may operate in a networked environment using logical connections to other aircraft systems and remote computers through a network, such as the network 820. The computer architecture 800 may connect to the network 820 through a network interface unit 806 connected to the bus 804. It should be appreciated that the network interface unit 806 may also be utilized to connect to other types of networks and remote computer systems. The computer architecture 800 may also include an input-output controller 822 for receiving and processing input from a number of other devices, including a control display unit, an EFIS control panel, a keyboard, mouse, electronic stylus, or touch screen that may be present on a connected aircraft display 112. Similarly, the input-output controller 822 may provide output to the aircraft display 112, a printer, or other type of output device. According to embodiments, the aircraft display 112 may be a map display such as the ND 202, or a non-map display, such as a PFD 402, a HUD 602, a control display unit, an electronic flight bag or other display device in the aircraft.

Based on the foregoing, it should be appreciated that technologies for displaying runway status on an aircraft display are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-readable medium having computer-executable instructions stored thereon that when executed by a computer, cause the computer to:

receive runway status information, regarding a runway, at the aircraft; and display at least one runway status indicator indicating the runway status information on a map display in the aircraft, wherein the at least one runway status indicator is displayed at a fixed scale independent of a scale of the map on the map display.

2. The computer-readable medium of claim 1, wherein the at least one runway status indicator is displayed in proximity to an ownship position indicator on the map display.

3. The computer-readable medium of claim 1, wherein the at least one runway status indicator is displayed as a symbol.

4. The computer-readable medium of claim 1, wherein the at least one runway status indicator is displayed as text.

5. The computer-readable medium of claim 1, wherein the map display is a navigation display.

6. The computer-readable medium of claim 1, wherein the at least one runway status indicator flashes on the map display.

7. The computer-readable medium of claim 1, wherein the at least one runway status indicator is displayed in proximity to a depiction of the runway on the map display.

8. A computer-implemented method for displaying a status of a runway on a non-map display in an aircraft, the method comprising:

receiving, at the aircraft, information regarding the current position, heading, and speed of the aircraft;

receiving, at the aircraft, information regarding the current position, heading, and speed of another aircraft;

combining the received information regarding the current position, heading, and speed of the aircraft and the received information regarding the current position, heading, and speed of the other aircraft;

determining a runway status of the runway based on the combined information; and displaying at least one runway status indicator indicating the runway status of the runway on the non-map display.

9. The method of claim 8, wherein the at least one runway status indicator is displayed as text.

10. The method of claim 8, wherein the at least one runway status indicator is displayed as a symbol.

11. The method of claim 8, wherein the at least one runway status indicator is displayed as a symbol.

12. The method of claim 8, wherein the non-map display is a head-up display.

13. The method of claim 8, wherein the at least one runway status indicator flashes on the non-map display.

14. An airport runway status display computer of an aircraft programmed to perform the steps of:

receiving runway status information, regarding a runway, at the aircraft; and displaying at least one runway status indicator indicating the runway status information on a display in the aircraft, at a position independent from a depiction of the runway on the display.

15. The computer of claim 14, wherein the at least one runway status indicator is displayed in proximity to an ownship position indicator on the display.

16. The computer of claim 14, wherein the at least one runway status indicator is displayed as a symbol.

17. The computer of claim 14, wherein the at least one runway status indicator is displayed as text.

18. The computer of claim 14, wherein the at least one runway status indicator is displayed at a fixed scale independent of a range setting of the display.

19. The computer of claim 14, wherein the display is at least one of a navigation display, a primary flight display, and a head-up display.

20. The computer of claim 14, wherein the at least one runway status indicator further comprises an aircraft symbol indicating at least one of the heading, speed, altitude, acceleration, and air/ground state of a runway associated with the aircraft.

* * * * *